United States Patent
Chen et al.

(10) Patent No.: US 10,725,889 B2
(45) Date of Patent: Jul. 28, 2020

(54) TESTING MULTI-THREADED APPLICATIONS

(71) Applicant: MICRO FOCUS LLC, Santa Clara, CA (US)

(72) Inventors: Bo Chen, Shanghai (CN); Jin-Feng Luan, Shanghai (CN); Dor Nir, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 14/909,526

(22) PCT Filed: Aug. 28, 2013

(86) PCT No.: PCT/CN2013/082433
§ 371 (c)(1),
(2) Date: Feb. 2, 2016

(87) PCT Pub. No.: WO2015/027403
PCT Pub. Date: Mar. 5, 2015

(65) Prior Publication Data
US 2016/0188441 A1    Jun. 30, 2016

(51) Int. Cl.
*G06F 9/30* (2018.01)
*G06F 11/36* (2006.01)
(Continued)

(52) U.S. Cl.
CPC ...... *G06F 11/3624* (2013.01); *G06F 11/3604* (2013.01); *G06F 11/3612* (2013.01);
(Continued)

(58) Field of Classification Search
CPC ............ G06F 11/3612; G06F 11/3631; G06F 11/3632; G06F 11/3684; G06F 11/3608;
(Continued)

(56) References Cited

U.S. PATENT DOCUMENTS 5,860,009 A * 1/1999 Uchihira ............... G06F 8/30
714/E11.208
6,002,869 A * 12/1999 Hinckley ............ G06F 11/3696
714/35
(Continued)

FOREIGN PATENT DOCUMENTS

| CN | 102073589 A | 5/2011 |
| CN | 102768637 A | 11/2012 |
| CN | 103049384 A | 4/2013 |

OTHER PUBLICATIONS

Marek Olszewski et al., Kendo: efficient deterministic multithreaded in software, May 7-11, 2009, [Retrieved on Jul. 4, 2019]. Retrieved from the internet: <URL: https://dl.acm.org/citation.cfm?id=1508256> 12 Pages (97-108) (Year: 2009).*

(Continued)

*Primary Examiner* — Anibal Rivera

(57) ABSTRACT

In one example, a method for testing a multi-threaded application includes running an initial test of the multi-threaded application and collecting thread generation data and determining the thread hierarchy. The thread execution is then modified to produce a modified configuration and a second test is run with the modified configuration. A device for testing of multi-threaded applications is also provided.

18 Claims, 5 Drawing Sheets

(51) Int. Cl.
*G06F 11/34* (2006.01)
*G06F 9/46* (2006.01)
*G06F 16/22* (2019.01)
*G06F 9/48* (2006.01)
*G06F 9/445* (2018.01)

(52) U.S. Cl.
CPC ...... *G06F 11/3636* (2013.01); *G06F 11/3672* (2013.01); *G06F 16/2246* (2019.01); *G06F 9/445* (2013.01); *G06F 9/467* (2013.01); *G06F 9/4843* (2013.01)

(58) Field of Classification Search
CPC .. G06F 11/36; G06F 11/3688; G06F 11/3604; G06F 11/3664; G06F 11/3648; G06F 11/3696; G06F 11/3636; G06F 11/3466; G06F 11/3428; G06F 11/3423; G06F 11/3414; G06F 11/0715; G06F 9/52; G06F 9/30; G06F 9/524; G06F 9/467; G06F 9/522; G06F 9/3808; G06F 9/506; G06F 9/3842; G06F 9/4843; G06F 9/5038; G06F 9/3834; G06F 9/445; G06F 8/34; G06F 8/314; G06F 8/458; G06F 8/456; G06F 8/30; G06F 8/45; G06F 21/577
See application file for complete search history.

(56) References Cited

U.S. PATENT DOCUMENTS

| | | | |
|---|---|---|---|
| 6,182,210 B1* | 1/2001 | Akkary | G06F 9/3834 712/216 |
| 6,247,121 B1* | 6/2001 | Akkary | G06F 9/3834 712/216 |
| 6,282,701 B1* | 8/2001 | Wygodny | G06F 11/3466 702/183 |
| 6,463,522 B1* | 10/2002 | Akkary | G06F 9/3834 712/216 |
| 6,826,752 B1* | 11/2004 | Thornley | G06F 9/52 717/100 |
| 6,832,376 B1* | 12/2004 | Sievert | G06F 9/4843 718/102 |
| 7,093,238 B2 | 8/2006 | Giovani et al. | |
| 7,412,692 B2* | 8/2008 | Biberstein | G06F 11/3688 714/E11.207 |
| 7,657,807 B1* | 2/2010 | Watkins | G01R 31/31859 714/718 |
| 7,797,733 B1* | 9/2010 | Sallam | G06F 21/577 726/4 |
| 8,286,138 B2 | 10/2012 | Sabella et al. | |
| 8,448,175 B2* | 5/2013 | Che | G06F 9/524 714/38.1 |
| 8,683,444 B1* | 3/2014 | Spycher | G06F 11/3636 717/125 |
| 9,135,139 B2* | 9/2015 | Wu | G06F 11/36 |
| 2002/0087950 A1* | 7/2002 | Brodeur | G06F 11/3636 717/124 |
| 2002/0124205 A1* | 9/2002 | Grey | G06F 11/3688 714/33 |
| 2002/0124241 A1* | 9/2002 | Grey | G06F 9/52 717/149 |
| 2003/0033511 A1* | 2/2003 | Akkary | G06F 9/3808 712/235 |
| 2003/0126517 A1* | 7/2003 | Givoni | G06F 11/3664 714/46 |
| 2004/0054944 A1* | 3/2004 | Bates | G06F 11/362 714/38.13 |
| 2004/0103410 A1* | 5/2004 | Sakai | G06F 8/456 717/146 |
| 2004/0189669 A1* | 9/2004 | David | G06F 9/451 345/619 |
| 2005/0081207 A1* | 4/2005 | Hoflehner | G06F 8/441 718/100 |
| 2005/0149908 A1* | 7/2005 | Klianev | G06F 8/34 717/109 |
| 2006/0117316 A1* | 6/2006 | Cismas | G06F 9/3851 718/103 |
| 2006/0129992 A1* | 6/2006 | Oberholtzer | G06F 11/3428 717/124 |
| 2006/0150184 A1* | 7/2006 | Hankins | G06F 9/4843 718/100 |
| 2006/0212868 A1* | 9/2006 | Takayama | G06F 9/52 718/100 |
| 2006/0218534 A1 | 9/2006 | Kahlon et al. | |
| 2006/0248401 A1* | 11/2006 | Carroll | G06F 11/3423 714/38.1 |
| 2007/0011671 A1* | 1/2007 | Kahlon | G06F 9/52 717/170 |
| 2007/0022407 A1* | 1/2007 | Givoni | G06F 11/3414 717/124 |
| 2007/0083813 A1* | 4/2007 | Lui | G06F 11/3612 715/709 |
| 2007/0101324 A1* | 5/2007 | Lupu | G06F 9/524 718/1 |
| 2008/0163184 A1* | 7/2008 | Kanade | G06F 8/314 717/149 |
| 2008/0209436 A1* | 8/2008 | Agha | G06F 11/3632 718/106 |
| 2008/0271042 A1* | 10/2008 | Musuvathi | G06F 11/3688 718/108 |
| 2009/0089817 A1* | 4/2009 | Bybell | G06F 9/30123 719/328 |
| 2009/0132796 A1* | 5/2009 | Snyder | G06F 9/3004 712/229 |
| 2009/0138682 A1* | 5/2009 | Capps, Jr. | G06F 9/30101 712/220 |
| 2009/0138683 A1* | 5/2009 | Capps, Jr. | G06F 9/30101 712/220 |
| 2009/0164755 A1* | 6/2009 | Bell, Jr. | G06F 9/3851 712/30 |
| 2009/0164759 A1* | 6/2009 | Bell, Jr. | G06F 9/3842 712/216 |
| 2009/0165016 A1* | 6/2009 | Bell, Jr. | G06F 9/5066 718/107 |
| 2009/0235234 A1* | 9/2009 | Biberstein | G06F 11/366 717/124 |
| 2009/0235262 A1* | 9/2009 | Ceze | G06F 9/52 718/102 |
| 2010/0011345 A1* | 1/2010 | Hickerson | G06F 11/3632 717/130 |
| 2010/0088546 A1* | 4/2010 | Chilimbi | G06F 11/366 714/26 |
| 2010/0122253 A1* | 5/2010 | McCart | G06F 8/458 718/100 |
| 2010/0250740 A1* | 9/2010 | Cao | G06F 9/54 709/224 |
| 2010/0281469 A1* | 11/2010 | Wang | G06F 8/45 717/128 |
| 2011/0023019 A1* | 1/2011 | Aniszczyk | G06F 9/445 717/128 |
| 2011/0078133 A1* | 3/2011 | Bordawekar | G06F 16/90335 707/713 |
| 2011/0126174 A1* | 5/2011 | Krauss | G06F 11/3466 717/127 |
| 2011/0126202 A1* | 5/2011 | Krauss | G06F 9/485 718/102 |
| 2011/0131550 A1* | 6/2011 | Burckhardt | G06F 11/3632 717/124 |
| 2011/0138236 A1* | 6/2011 | Park | G06F 11/0715 714/57 |
| 2011/0179399 A1* | 7/2011 | Bekiroglu | G06F 11/36 717/131 |
| 2011/0225589 A1* | 9/2011 | Pirog | G06F 9/3851 718/102 |
| 2011/0283262 A1* | 11/2011 | Ceze | G06F 9/467 717/128 |

(56) References Cited

U.S. PATENT DOCUMENTS

| | | | |
|---|---|---|---|
| 2011/0314338 A1* | 12/2011 | Erickson | G06F 11/3632 714/37 |
| 2012/0030657 A1* | 2/2012 | Gao | G06F 9/524 717/128 |
| 2012/0089812 A1* | 4/2012 | Smith | G06F 9/4843 712/21 |
| 2012/0117544 A1* | 5/2012 | Kakulamarri | G06F 11/3612 717/126 |
| 2012/0174074 A1* | 7/2012 | Ganai | G06F 8/314 717/126 |
| 2012/0266139 A1* | 10/2012 | Bates | G06F 11/3664 717/125 |
| 2012/0266140 A1* | 10/2012 | Bates | G06F 11/3664 717/125 |
| 2013/0074042 A1* | 3/2013 | Engelbeck | G06F 11/3636 717/125 |
| 2013/0227528 A1* | 8/2013 | Mathew | G06F 11/3684 717/124 |
| 2013/0254747 A1* | 9/2013 | Citron | G06F 11/3672 717/126 |
| 2013/0283101 A1* | 10/2013 | Yang | G06F 11/3612 714/37 |
| 2014/0007054 A1* | 1/2014 | Wu | G06F 11/36 717/124 |
| 2014/0115604 A1* | 4/2014 | Gottschlich | G06F 11/3648 718/106 |
| 2014/0181767 A1* | 6/2014 | Kohavi | G06F 17/5081 716/106 |
| 2014/0282423 A1* | 9/2014 | Gottschlich | G06F 9/52 717/127 |
| 2014/0366006 A1* | 12/2014 | Gottschlich | G06F 11/3664 717/125 |
| 2015/0067852 A1* | 3/2015 | Cher | G06F 21/554 726/23 |
| 2015/0121342 A1* | 4/2015 | Abdel-Hafez | G06F 11/3688 717/124 |
| 2015/0199252 A1* | 7/2015 | Ilangovan | G06F 11/3409 702/186 |
| 2015/0286470 A1* | 10/2015 | Dahan | G06F 11/3636 717/127 |

OTHER PUBLICATIONS

M.M Bezemer et al., Luna: Hard Real-Time, Multi-Threaded, CSP-Capable Execution Framework, Nov. 2011, [Retrieved on Jul. 4, 2019]. Retrieved from the internet: <URL: https://ris.utwente.nl/ws/files/5311889/Bezemer2011cpa.pdf> 19 Pages. (157-175) (Year: 2011).*

Artho, Cyrille, Finding Faults in Multi-threaded Programs, Thesis, Mar. 15, 2001, 136 pgs. http://staff.aist.go.jp/c.artho/papers/mthesis.pdf.

Eytani, Y. et al., Toward a Benchmark for Multi-threaded Testing Tools, Jun. 7, 2004, 10 pgs. http://ti.arc.nasa.gov/m/pub-archive/886h/0886%20(Eytani).pdf.

Fonseca, P. et al., Finding Complex Concurrency Bugs in Large Multi-threaded Applications, Apr. 10-13, 2011, 14 pages. http://www.mpi-sws.org/~rodrigo/eurosys11-pike.pdf.

International Search Report and Written Opinion, PCT Patent Application No. PCT/CN2013/082433, dated May 7, 2014, 18 pages.

* cited by examiner

TESTING MULTI-THREADED APPLICATIONS

CROSS-REFERENCE TO RELATED APPLICATION

This application is a U.S. National Stage Application of and claims priority to international Patent Application No. PCT/CN2013/082433, filed on Aug. 28, 2013, and entitled "TESTING MULTI-THREADED APPLICATIONS".

BACKGROUND

In computer software, multi-threaded applications have separate paths of execution (threads) that can be run concurrently. Conversely, sequential programs are executed linearly. Multi-threaded applications are able to take advantage of multiprocessor hardware and can improve the perceived responsiveness of an application and improve its actual performance.

When instructions in an application are executed concurrently the execution usually becomes nondeterministic, that is, the order that threads run may be variable. This introduces a complexity to programming that may give rise to defects that are difficult to debug.

BRIEF DESCRIPTION OF THE DRAWINGS

The accompanying drawings illustrate various examples of the principles described herein and are a part of the specification. The illustrated examples are merely examples and do not limit the scope of the claims.

Throughout the drawings, identical reference numbers designate similar, but not necessarily identical, elements.

DETAILED DESCRIPTION

Figure 1:
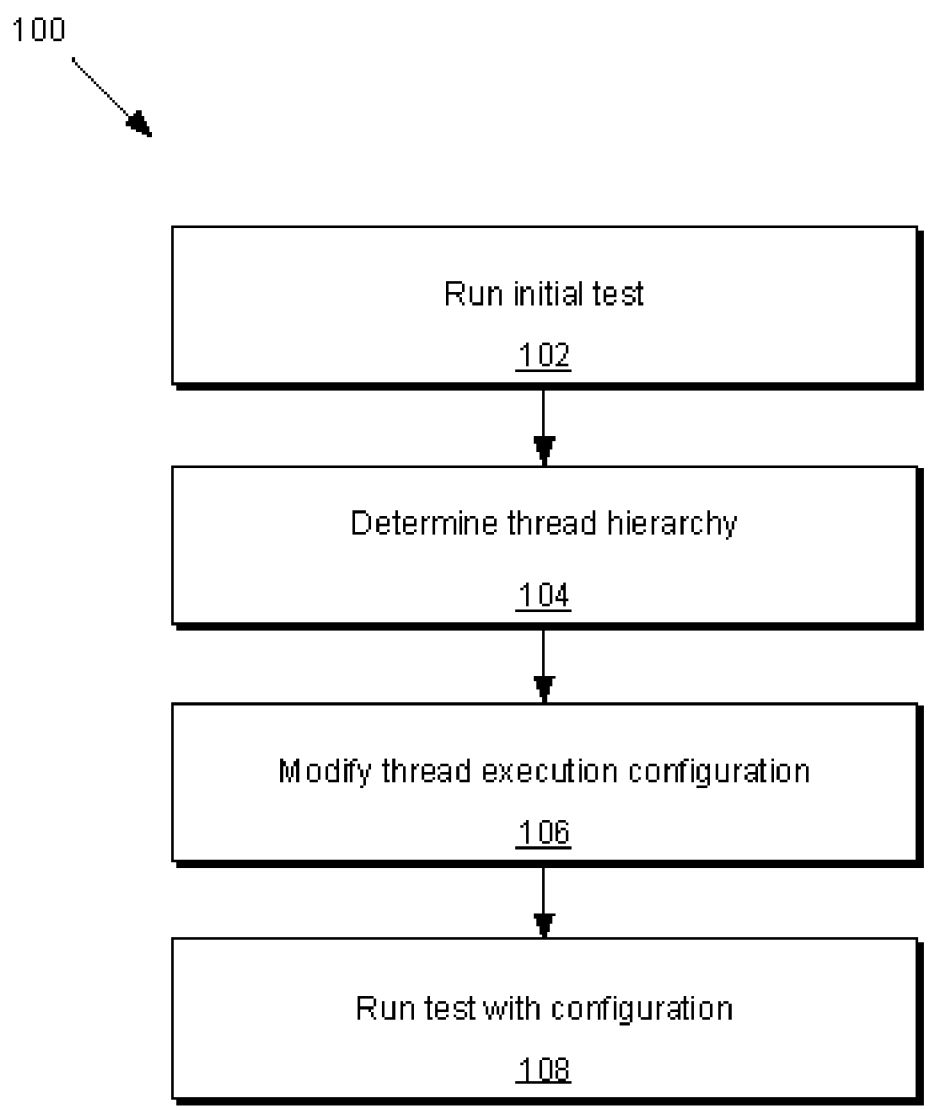
FIG. 1 is a flowchart showing an illustrative method of testing a multi-threaded application, according to one example of principles described herein.

As discussed above, multi-threaded applications have separate paths of execution that can be run concurrently. Multi-threaded applications can potentially take advantage of multiprocessor hardware and can improve the perceived responsiveness of an application and improve its actual performance.

When multiple threads in an application are executed concurrently the execution usually becomes nondeterministic, that is, the order that threads run may be variable. This introduces a complexity to programming that may give rise to defects that are difficult to debug. For example, threads may need to coordinate their actions in order to properly execute the code and threads in the same process may need access to the same location in memory. If two or more threads try to read or write to the same location in memory at the same moment, errors can occur.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

As discussed above, simultaneously executed threads may need to coordinate their actions in order to execute some types of code. This can introduce a level of complexity that can be challenging to address. For example, a program is designed to increment a variable named "totalRequests" each time the program receives a request; this action takes three instructions: (1) Load the value for totalRequests into a register. (2) Increment the value in that register by one. (3) Store the resulting value back into memory.

Several scenarios may occur when executing this code in a multi-threaded environment. One scenario may occur where the program happens to receive requests in such a way that no two threads are accessing the value of totalRequests near the same time. In this scenario, incrementing the value of totalRequests will not cause any undesirable results.

In another scenario, however, in order to increment the value of totalRequests, more than one thread may attempt to access the value of totalRequests at the same time. For example, two requests are made in the program almost simultaneously; Thread #2 and Thread #4 are assigned to handle these requests, which include incrementing the value of totalRequests each time a request is handled. The current value of totalRequests is "0". Thread #2 loads the value for totalRequests into a register and then increments the value in that register by one, so now the value stored in Thread #2's register is "1". However, before Thread #2 can store the resulting value back into memory, Thread #4 loads the value of totalRequests, which is "0", into another register. Just after this occurs, Thread #2 stores the value of "1" back into memory. Thread #4 increments the value of "0" in its register by one and then writes that value, a value of "1", back to memory causing an error. Two requests were made, but after both requests were handled the value of totalRequests is equal to "1" instead of "2".

There are two main reasons why these types of errors may be difficult to debug. First, the potential error may be hard to find since it may never be triggered during testing; triggering the error may require a very specific or extreme set of conditions. Further, there are a near infinite number of conditions under which to test an application, thus the possible difficulty of causing a potential error to be manifest. This type of error is a manifestation of a "race condition" and is only one type of error that can occur during multi-threaded execution. A race condition occurs where the behavior of an electronic or software system is dependent on the sequence or timing of other events. Where the events do not happen in the order that the programmer intended the race condition becomes a bug.

Second, even if a race condition is triggered and an error is found, it may be difficult to trace the resulting error back to the code that allowed for a race condition to exist in the first place. This is a simple example, but is the basis for many errors in multithreaded programs based on the complexity arising from threads sharing access to the same memory locations.

FIG. 1 is a flowchart of a method (100) for testing a multi-threaded application. An initial test is run (block 102)

on the application. There are two major scheme parameters with which a test may run. One is in debug mode and the other in release mode. In debug mode a program is compiled with less optimization so that the compiled code runs in a similar order to the way the code was written by the programmer. This less optimized compilation of the multi-threaded application is then executed and analyzed. This can help in the understanding of the code execution.

In release mode, the code is highly optimized so that it will run quickly and efficiently. This, however, may make the order of execution of the compiled code unrecognizable from the context of the written code. For this reason it may be desirable to run the initial test in debug mode so that a familiar program structure may be captured. This, however, may not be required when using modern programming languages that help to capture the original structure of the written program even when in release mode.

Figure 2A:
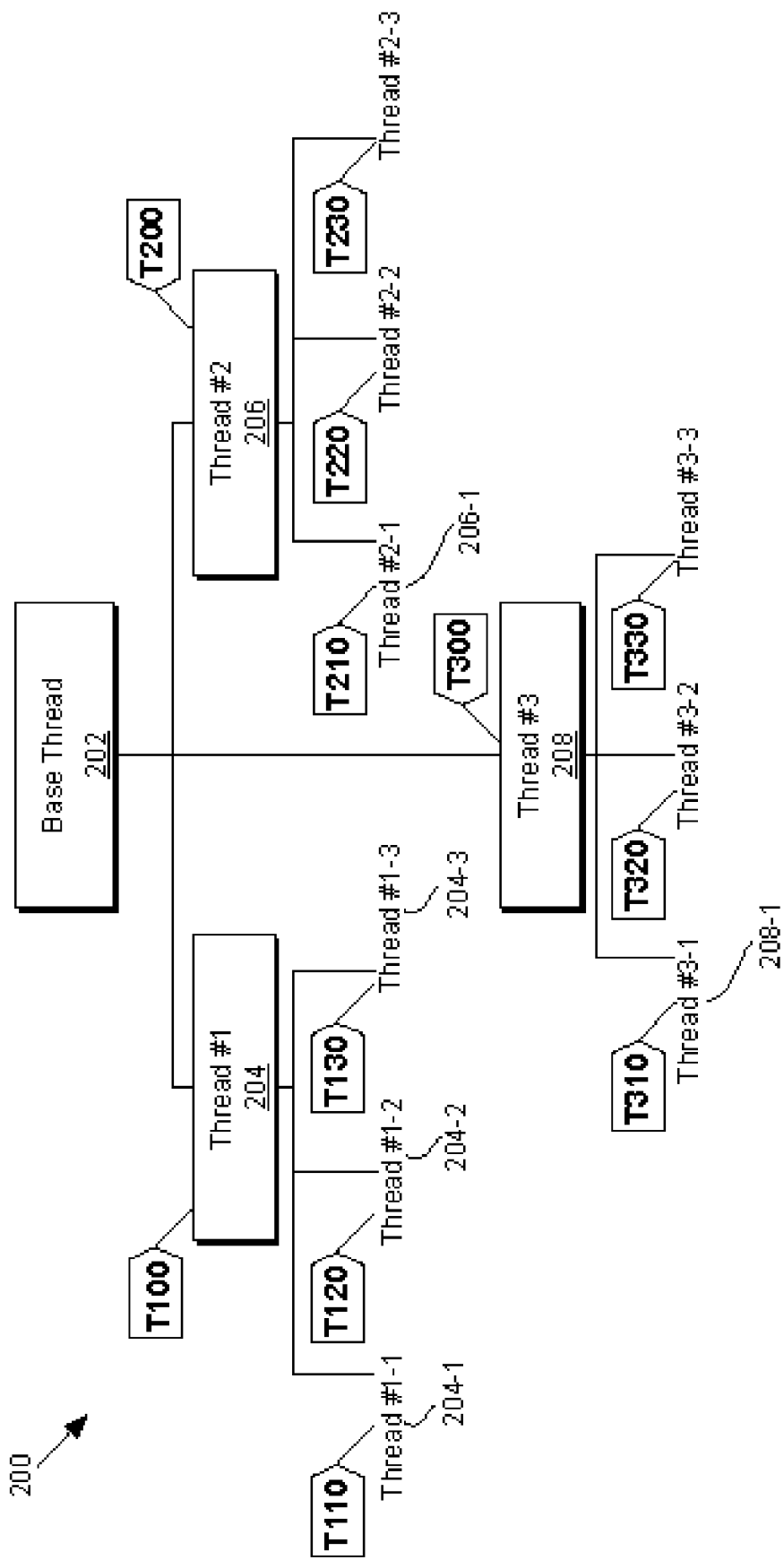
FIG. 2A is a diagram of a thread hierarchy, according to one example of principles described herein.
Figure 2B:
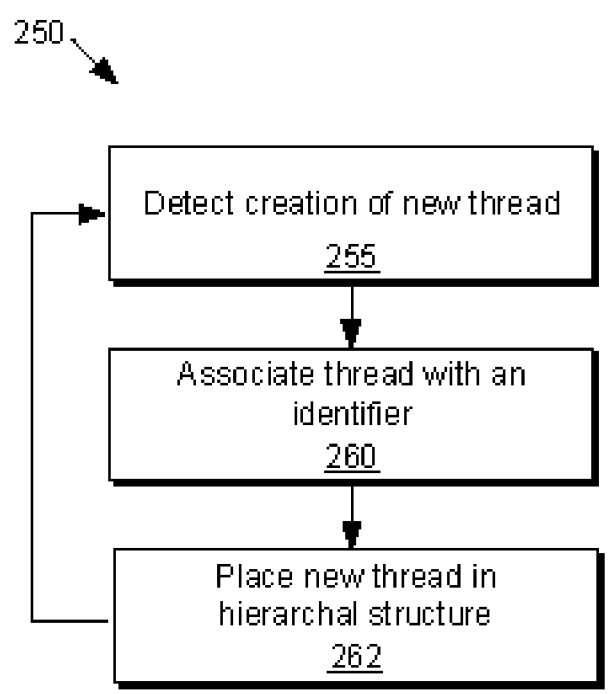
FIG. 2B is a flowchart of a method for creating a thread hierarchy, according to one example of principles described herein.

As the initial test runs, the thread hierarchy is determined (block 104). For example, an operating system may provide functionality for observing the thread activity of a running application/process. An application running in an operating system may have one or more processes, but for the purposes of the examples in this specification a running application is considered equivalent to a process. Throughout the running time of the process new threads may be created and existing threads may be terminated. Threads may create threads of their own called sub threads. If a thread creates a sub thread, the thread that creates the sub thread is called the parent of the sub thread and the sub thread is called the child of the thread that created it. Each thread has one parent and may have multiple children. Threads created by the same parent are siblings. These relationships form a hierarchy. A method for determining thread hierarchy is explained later in this specification (see e.g. FIGS. 2A and 2B).

After the thread hierarchy has been determined (block 104), the thread execution configuration is modified (block 106). A thread execution configuration determines how each thread will be executed during a multi-threading test. A method for configuring thread execution is explained later in this specification (see e.g. FIG. 3). By making various modifications to the thread execution configuration various potential errors can be discovered. Once the thread execution configuration is selected (block 106) a second test is run with that configuration (block 108).

FIG. 2 shows a diagram of a thread hierarchy (200) and a method for determining the thread hierarchy (250). In this example, the running application has a Base Thread (202) which has three children: Thread #1 (204), Thread #2 (206), and Thread #3 (208). In addition, each of these threads has multiple child threads. For example, Thread #1-1 (204-1), Thread #1-2 (204-2), and Thread #1-3 (204-3) are children of Thread #1.

In most implementations, the order that a thread's children are created is independent of operating system runtime and can always be determined. In this example, the Base Thread (202) created Thread #1 (204) first, Thread #2 (206) second, and Thread #3 (208) third. Similarly, Thread #1 created Thread #1-1 (204-1) first, Thread #1-2 (204-2) second, and Thread #1-3 (204-3) third. Since threads higher in the hierarchy must be created in order to create other threads lower in the hierarchy, it is evident that parent threads are always created before their children.

The create order in other relationships, however, is dependent on operating system runtime and therefore is variable and not statically defined. In this example, it cannot be determined if Thread #1-1 (204-1) was created before Thread #2-1 (206-1) or Thread #3-1 (208-1). Indeed, these threads could have been created in any order with respect to each other.

In order to determine the thread hierarchy during an initial test run, the fixed create order of parent/child and sibling relationships is used. A method for determining thread hierarchy (250) is shown. This method proceeds in a loop; the creation of a new thread is detected (block 255) and then that new thread is associated with an identifier (block 260) and the new thread is appropriately placed in the hierarchal structure (block 262). The method then continues. For example, the Base Thread (202) creates Thread #1 (204), this event is detected (block 255) and Thread #1 is associated with an identifier (block 260) of "T100" and placed in the hierarchal structure (block 262). The Base Thread then creates Thread #2 (206) and this is detected (block 255) and Thread #2 is associated with an identifier (block 260) of "T200". Thread #1 then creates Thread #1-1, this is detected and an identifier of "T110" is associated with it. This process continues until all of the threads associated with this process have been associated with an identifier and appropriately placed in the hierarchal structure (block 262). Once each thread has been created and associated with an identifier the complete thread hierarchy has been determined.

In this example, identifiers are an alphanumerical value such as "T100", but in other examples they may take on any value. For example, the thread identifiers may include an identification of a parent thread and an identifier of a child's order of creation by the parent thread. For example in the implementation above, a parent thread is identified as "T100" and all child threads of this process can be assigned an identifier that includes "T1". The remaining numbers in the child thread identifier can describe the creation order of the child among its sibling threads. A variety of other techniques can also be used for labeling the threads, such as tagging the thread with a parent thread identifier and a creation time. The identifier for each thread can be unique.

Once a thread hierarchy is known, that hierarchy can be presented to a tester of the application and the tester can make decisions about how to modify the thread execution to find multi-threading errors in the application. Also, instead of relying on the tester to know how to modify the thread execution, various profiles may be provided which contain rules for modifying how threads are executed.

For example, rules may include modifying thread execution by slowing threads down or lowering their priority, speeding threads up or increasing their priority, pausing threads, and stopping treads from running. Thread priority or speed depends on how much central processing unit (CPU) time they are given to run. If a thread has a low priority, it will not be run unless enough higher priority threads are paused or terminated, thus it will receive less CPU time than higher priority threads and run slower. A thread is essentially sped up if all other threads are given a lower priority or slowed down. When a thread depends on variable external events, the thread can have a variable delay. For example, when a thread is instructed to retrieve information from a network it may take a variable amount of time to return the desired information depending on the connection speed, size of the data, state of the network, and other factors. The ability to modify thread execution can help testers to discover multi-threading errors.

Figure 3:
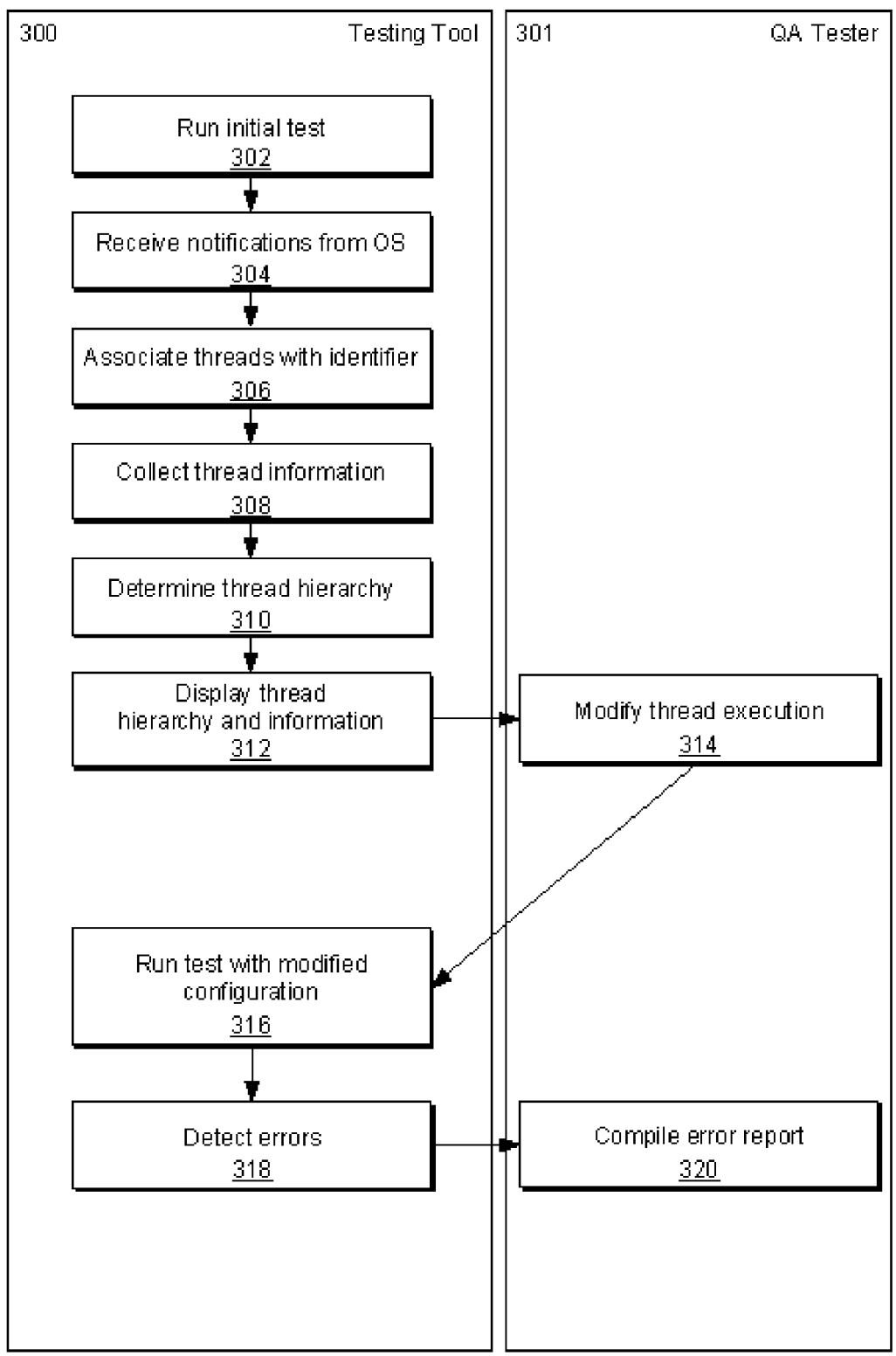
FIG. 3 is a flowchart showing an illustrative method of testing a multi-threaded application, according to one example of principles described herein.

FIG. 3 shows a method for modifying thread execution to discover multi-threading errors. In this example, an application is to be tested in the Microsoft Windows operating system for multi-threading errors by a quality assurance (QA) tester (301). A testing tool (300) is configured to receive notifications from the operating system (OS) about threads created within processes running in the OS. Notifications may be generated/received in a variety of ways, including through an application programming interface (API). For example an API such as WINAPI may be used. WINAPI is defined in kernal32.dll, which is a dynamic link library in the Microsoft Windows® operating system that is used in memory management, input/output operations, process and thread creation, and synchronization functions. The thread information may include identification of a parent thread of a child thread and may also include identification of a numeric order in which the parent thread generated the child thread among sibling threads.

When the initial test is run (block 303) the testing tool receives notifications from the OS (block 304) about the new threads created within the application. The testing tool associates each new thread with an identifier (block 306). The testing tool also collects information on each thread created in the application (block 308). This information may include the number of threads created in the application, thread names, and thread function call information.

The testing tool (300) then uses the thread identifiers to determine the thread hierarchy (block 310) of the application. Then it displays the thread hierarchy and information to the QA tester (301). The QA tester modifies the thread execution (block 314) in an attempt to uncover multi-threading errors. For example, the QA tester may identify threads with a potential for variable execution time and modify their execution times. In one implementation, the QA tester may choose to modify the thread execution with a predefined thread profile that slows down threads that make network requests. The QA tester may be a program, human tester, or a human tester monitoring a program. In some examples, the QA tester may be a software program run on the same or a different computing device as the testing tool. The QA tester program may include a graphical user interface that accepts inputs from a human user.

When the QA tester (301) runs a test with this configuration (block 316) a first thread, Thread #1, executes a function that creates and sends a network request to a server for some data. A second thread, Thread #2, accesses the data received through the request made by the first thread. Because Thread #1 makes a network request, it is slowed down because of the modified thread execution profile. As a result, the Thread #2 reaches the point of accessing the received network request data before the request has been completed and tries to access invalid memory. The testing tool (300) detects this error (block 318) and reports it to the QA tester (301).

The process of modifying thread execution (block 314) and running the test with the modified configuration (block 316) continues until all the desired range of execution times for the various selected threads has been performed. This may require one test or multiple tests.

The QA tester (301) compiles an error report (block 320) and presents it to the user. For example, the thread hierarchy may be presented in a dynamic graphical format that shows a time progression of the thread execution that led to the error. By replaying at least a portion of the test that resulted in the error, the user can more accurately identify the interplay between the various threads that resulted in the error. The dynamic display of the thread hierarchy may include a variety of techniques to identify threads that were active during the portion of the test that produced the error and indicating which active threads conflicted to produce the error. For example, active threads may be indicated by using highlighting and interaction between active threads can also be shown graphically.

Because the tester knows under what conditions the error occurred, the tester is better able to provide useful information to the programmer who is to fix the error in finding the error-causing code so that it can be corrected. In the example above, the graphical display and/or report will show that Thread #2 caused the error and that the error occurred when threads making network requests were slowed down.

Such information, along with the information collected on each thread, may be helpful for a programmer trying to resolve the error. This information not only tells the programmer the conditions under which the error occurred, but provides a list of functions in the code that the error is associated with.

Figure 4:
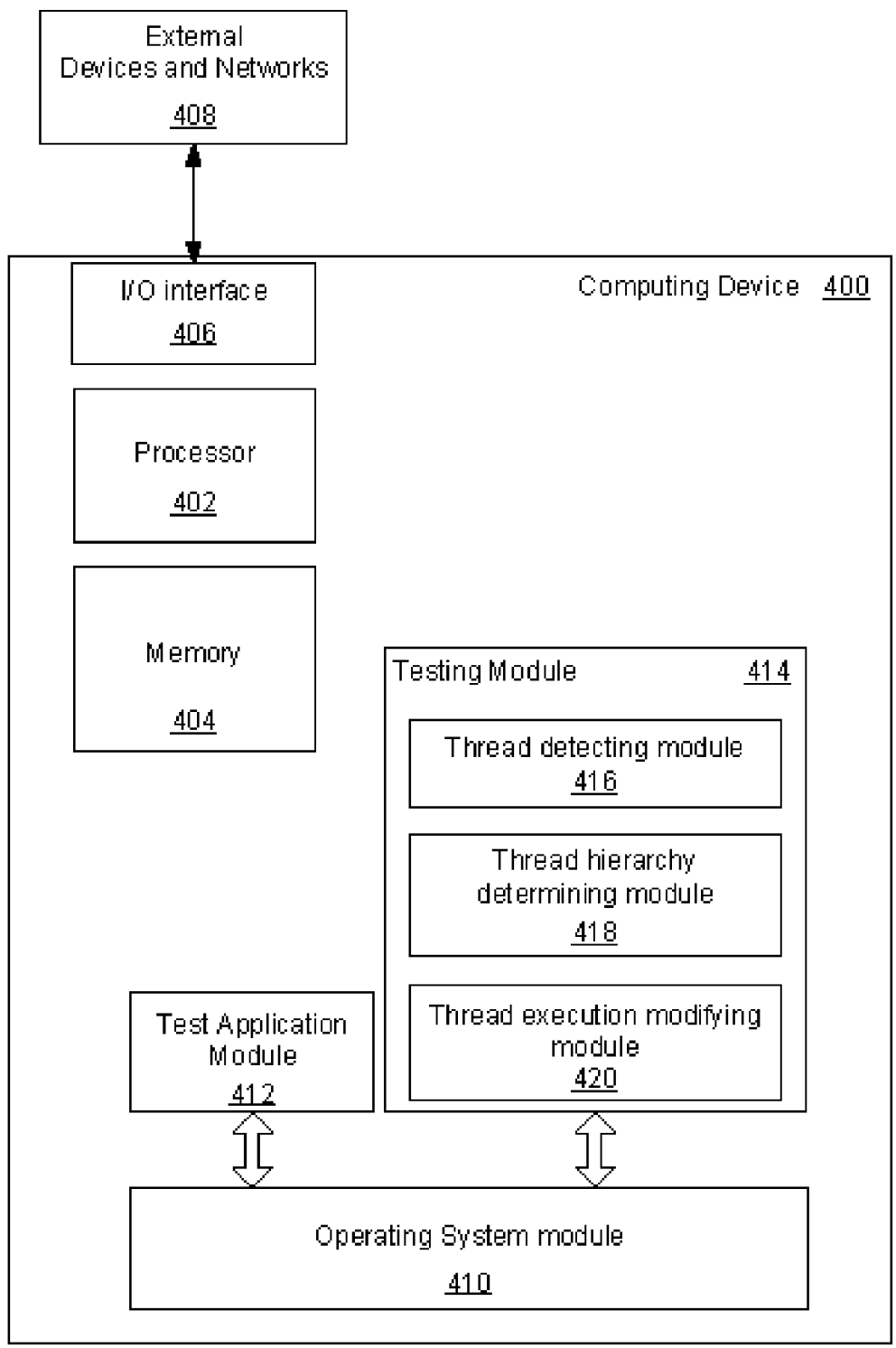
FIG. 4 is an example of a device for testing a multi-threaded application, according to one example of principles described herein.

FIG. 4 is a computing device for testing software applications for multi-threading errors. The computing device (400) includes a computational processor (402) and a memory (404). The memory may include a variety of instructions and a multithreaded application. The processor retrieves instructions from the memory and executes those instructions to control and/or implement the various functionalities and modules of the computing device. For example, the computing device and instructions may execute any of the methods described above.

The computing device also includes an input/output component which is illustrated as an I/O interface (406). The I/O interface may interact with a variety of elements, including external devices and networks (408). These interactions may include accepting inputs, such as receiving thread execution configurations and providing outputs such a thread hierarchy. The operating system module (410) may provide OS services such as multi-threading support, thread notifications, and inter-module communication to the test application module (412) and the testing module (414). The testing module runs tests and includes several sub modules, namely, a thread detecting module (416), a thread hierarchy determining module (418), and a thread execution modifying module (420). For example, the thread detecting module (416) may collect thread generation data from a variety of sources. The thread hierarchy determining module (418) may create a thread hierarchy and the thread execution modifying module (420) may modify thread execution to produce a modified configuration. The test application module (412) runs a second test with the modified configuration.

Although FIG. 4 shows a single device performing testing of a multi-threaded application, a variety of other configurations could be used. For example, two or more computing devices could be in communication with a first computing device executing the multi-threaded application in the operating system environment and a second computing device monitoring and testing the execution of the application.

The principles described herein may also be embodied as a computer program product that includes one or more computer readable storage medium(s) having computer readable program code embodied thereon. In the context of this document, a computer readable storage medium may be any tangible medium that can contain, or store a program for use by or in connection with an instruction execution system, apparatus, or device. Computer program code for carrying out operations according to the principles described herein may be written in any suitable programming language.

For example, a computer program product for testing multi-threaded applications may include a computer readable storage medium having computer readable program code embodied therewith. The computer readable program code includes code to run an initial test of a multi-threaded application and collect thread generation data including identification of a parent thread for each child thread. The code may also determine a thread hierarchy by creating a hierarchal tree showing parent child relationships between threads and modify a thread execution of at least one thread with a variable execution time to produce a modified configuration. The code then runs a second test with the modified configuration and monitors the second test for errors.

The principles described above allow for more thorough and understandable testing of multithreaded applications. The systems, methods, and devices described can provide reports of errors and potentially graphical replay of the events leading up to the error. This can make the error much easier to debug because the actions and settings taken to produce the error are more evident.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for testing a multi-threaded application comprising:
   running, with a computational processor, an initial test of the multi-threaded application and collecting thread generation data comprising identification of a parent thread for each of a plurality of child threads of the multi-threaded application;
   generating, by the computational processor, a hierarchal tree comprising parent-child relationships determined from the identification of the parent thread for each child thread;
   collecting thread information relating to each thread in the multi-threaded application, including a number of threads created in the multi-threaded application and function call information relating to each thread;
   determining, with the computational processor, a thread hierarchy based on the hierarchal tree, wherein determining the thread hierarchy includes associating each thread with a unique identifier comprising an identifier of a parent thread and an identifier of a child thread's order of creation by its parent thread for a child thread of the parent thread;
   utilizing the thread information relating to each thread and the thread hierarchy to determine an error in execution of the multi-threaded application;
   modifying, using the determined error and a predefined thread profile, a thread execution priority of at least one thread of the multi-threaded application to produce a modified configuration of the multi-threaded application based on the thread hierarchy; and
   running, with the computational processor, a second test with the modified configuration of the multi-threaded application.

2. The method of claim 1, further comprising compiling the multi-threaded application in a debug mode with less optimization than a release mode, in which running the initial test comprises executing the compiled multi-threaded application.

3. The method of claim 1, in which running the initial test comprises executing the multi-threaded application in a release mode.

4. The method of claim 1, in which determining the thread hierarchy comprises:
   receiving notifications of thread generation from an operating system; and
   organizing the thread information relating to each thread into the thread hierarchy.

5. The method of claim 4, in which notifications of thread generation from the operating system comprises notifications of new thread generation from a dynamic link library within the operating system.

6. The method of claim 4, in which collecting thread information relating to each thread further comprises identifying, for a parent thread and a corresponding child thread of the multi-threaded application, a numeric order in which the parent thread generated the child thread among sibling threads.

7. The method of claim 4, further comprising displaying the thread hierarchy in a dynamic graphical format to a user.

8. The method of claim 1, in which modifying a thread execution to produce a modified configuration comprises:
   identifying threads with a potential for variable execution times; and
   modifying the execution time of the identified threads.

9. The method of claim 8, in which modifying the execution time of the identified threads comprises delaying execution of the identified threads.

10. The method of claim 1, further comprising:
    running the second test with the modified configuration;
    detecting an error associated with the second test; and
    compiling an error report.

11. The method of claim 10, further comprising presenting the error report to a user by replaying at least a portion of the test with the modified configuration that produced the error associated with the second test.

12. The method of claim 11, in which the error report is presented graphically by:
    displaying the thread hierarchy in the modified configuration as a hierarchical tree;
    graphically indicating which threads are active during a portion of the test that produced the error associated with the second test; and
    indicating which active threads are conflicted to produce the error associated with the second test.

13. The method of claim 12, in which:
    graphically indicating the active threads comprises highlighting the active threads on the hierarchical tree; and
    graphically indicating interactions between the active threads on the hierarchical tree.

14. A computing device comprising:
    a memory storing module instructions and a multi-threaded application; and
    a processor to execute the module instructions to form modules, wherein the modules comprise:
       a thread detecting module to run an initial test comprising running the multi-threaded application and collecting thread generation data comprising identification of a parent thread for each of a plurality of child threads of the multithreaded application and thread information relating to each thread in the multi-threaded application, including a number of threads created in the multi-threaded application and function call information relating to each thread;
       a thread hierarchy module to create a thread hierarchal tree comprising parent child relationships determined from the identification of the parent thread for each child thread, wherein to create the thread hierarchal tree, the thread hierarchy module associates each thread with a unique identifier comprising an identifier of a parent thread and an identifier of a child thread's order of creation by its parent thread for a child thread of the parent thread;

a thread execution modify module to determine, utilizing the thread information relating to each thread and a thread hierarchy based on the thread hierarchal tree, an error in execution of the multi-threaded application and to modify, using the determined error and a predefined thread profile, priority of at least one thread of the multi-threaded application to produce a modified configuration of the multi-threaded application based on the thread hierarchal tree; and a test application module to run a second test with the modified configuration.

15. The device of claim 14, further comprising an operating system module, in which the thread detecting module is to collect the thread generation data from the operating system module.

16. The device of claim 14, in which the thread execution modify module is to:

identify threads with a potential for variable execution times; and delay the execution of threads with variable execution times to produce a modified thread execution.

17. The device of claim 16, in which the test application module is to run the modified thread execution.

18. A computer program product for testing multi-threaded applications the computer program product comprising:

a non-transitory computer readable storage medium having computer readable program code embodied therewith, the computer readable program code comprising:

computer readable program code to run an initial test of a multi-threaded application and collect thread generation data including identification of a parent thread for each child thread;

computer readable program code to determine a thread hierarchy by creating a hierarchal tree showing parent-child relationships between threads and associating each thread with a unique identifier comprising an identifier of a parent thread and an identifier of a child thread's order of creation by its parent thread for a child thread of the parent thread;

computer readable program code to collect thread information relating to each thread in the multi-threaded application, including a number of threads created in the multi-threaded application and function call information relating to each thread;

computer readable code to utilize the thread information relating to each thread and the thread hierarchy to determine an error in execution of the multi-threaded application;

computer readable program code to modify, using the determined error and a predefined thread profile, a thread execution priority of at least one thread with a variable execution time to produce a modified configuration of the multi-threaded application; and computer readable program code to run a second test with the modified configuration of the multi-threaded application and monitor the second test for errors.

* * * * *